United States Patent
Kempf et al.

(10) Patent No.: US 8,482,613 B2
(45) Date of Patent: Jul. 9, 2013

(54) APPARATUS AND METHOD FOR PHOTOGRAPHING BIRDS

(76) Inventors: John Kempf, Roslyn, NY (US); Bart Stephens, Birmingham, AL (US); Fuxian Yin, Toronto (CA); Stylianos Derventzis, Toronto (CA)

( * ) Notice: Subject to any disclaimer, the term of this patent is extended or adjusted under 35 U.S.C. 154(b) by 1673 days.

(21) Appl. No.: 11/852,650

(22) Filed: Sep. 10, 2007

(65) Prior Publication Data
US 2009/0067676 A1  Mar. 12, 2009

(51) Int. Cl.
*H04N 5/33*  (2006.01)

(52) U.S. Cl.
USPC ........... 348/164; 348/151; 348/154; 250/330; 382/107

(58) Field of Classification Search
USPC .............. 348/151–155, 164, 208.4, 208.14, 348/208.16; 250/330, 334, 338.1; 382/106–107
See application file for complete search history.

(56) References Cited

U.S. PATENT DOCUMENTS

| | | | | |
|---|---|---|---|---|
| 5,369,276 A * | 11/1994 | Antesberger | ................. | 250/334 |
| 5,493,118 A * | 2/1996 | Okuda et al. | ................. | 250/334 |
| 6,256,033 B1 * | 7/2001 | Nguyen | ....................... | 715/863 |
| 7,400,823 B2 * | 7/2008 | Kakiuchi | ................... | 348/208.4 |
| 7,541,588 B2 * | 6/2009 | Tabirian et al. | ............ | 250/341.1 |
| 7,683,962 B2 * | 3/2010 | Border et al. | ................ | 348/348 |
| 8,144,206 B2 * | 3/2012 | Fukushima et al. | ........ | 348/222.1 |
| 8,269,834 B2 * | 9/2012 | Albertson et al. | ............ | 382/107 |
| 2005/0035858 A1 * | 2/2005 | Liu | .............................. | 348/152 |
| 2005/0128584 A1 * | 6/2005 | Shulman et al. | ............. | 359/462 |
| 2007/0241863 A1 * | 10/2007 | Udagawa et al. | .......... | 250/338.1 |
| 2009/0185900 A1 * | 7/2009 | Hirakata et al. | ................. | 416/1 |

* cited by examiner

*Primary Examiner* — Bharat N Barot
(74) *Attorney, Agent, or Firm* — Veal Intellectual Property, LLC; Robert J. Veal

(57) ABSTRACT

A motion detector actuated camera for taking pictures of birds or other small thermally discernable objects utilizes a plurality of filters to detect the speed of certain bird movements within the field of view of the camera to actuate the camera when a bird is in the field of view and capture images while the bird moves about the field of view.

12 Claims, 3 Drawing Sheets

The output response of the PIR sensor circuit depends is designed to depend on the speed of the detected subject and the characteristics of the filter

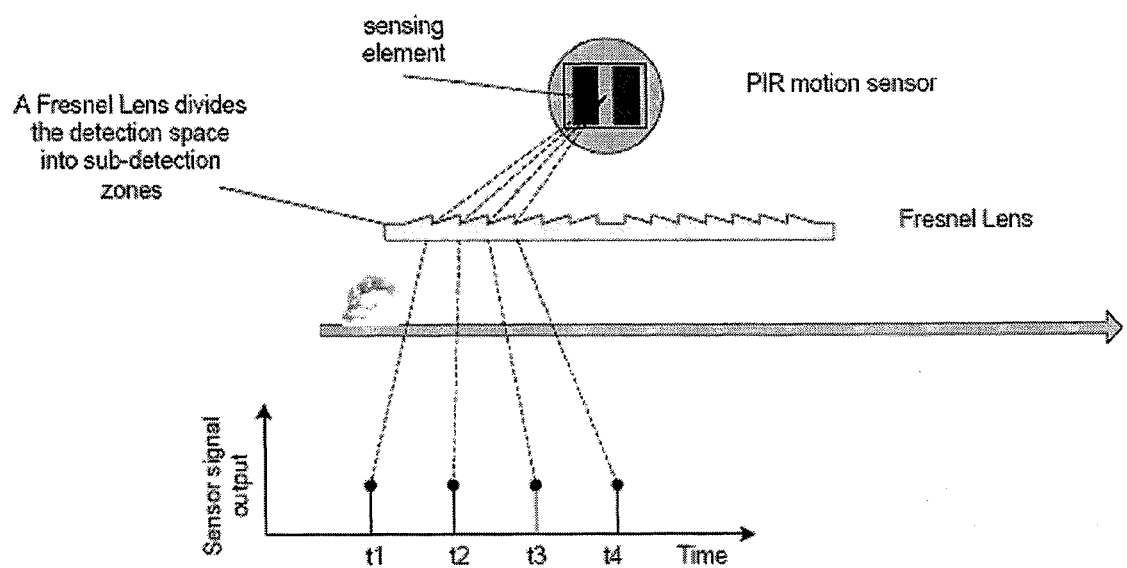
Figure 1: Principle of motion sensing
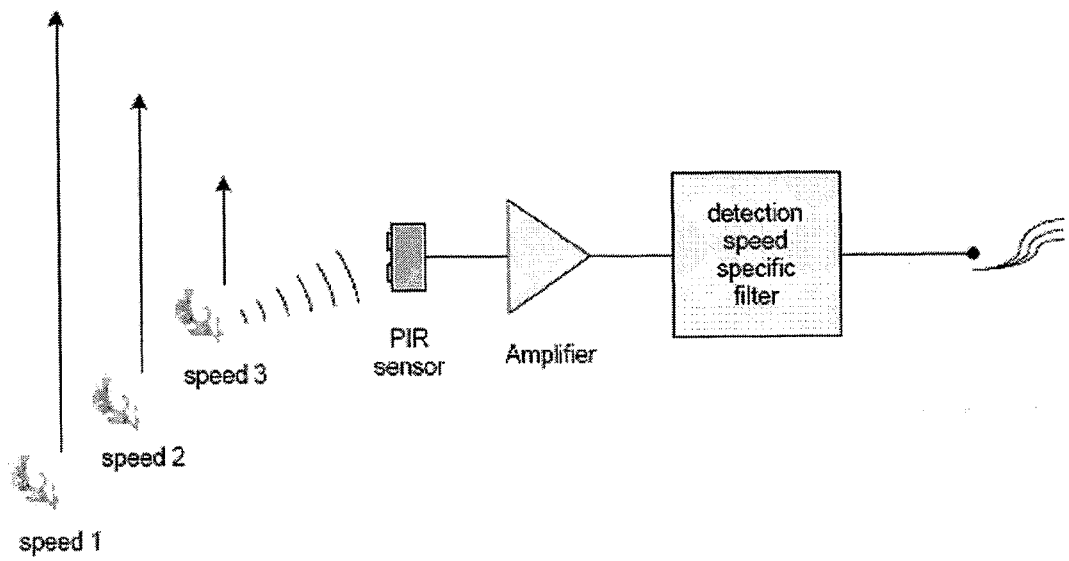
Figure 2: The output response of the PIR sensor circuit depends is designed to depend on the speed of the detected subject and the characteristics of the filter

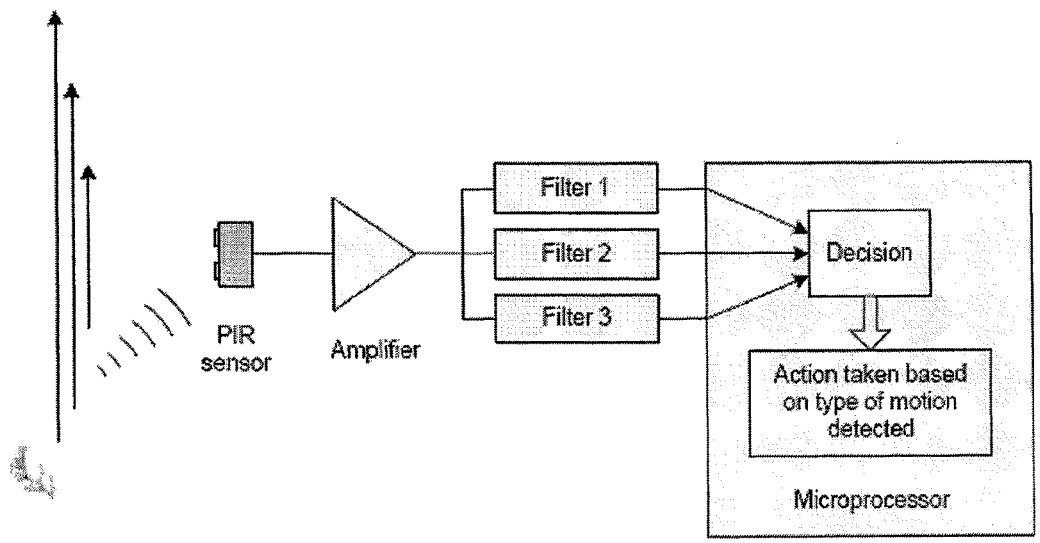
Figure 3: Different filters can detect different type of motion
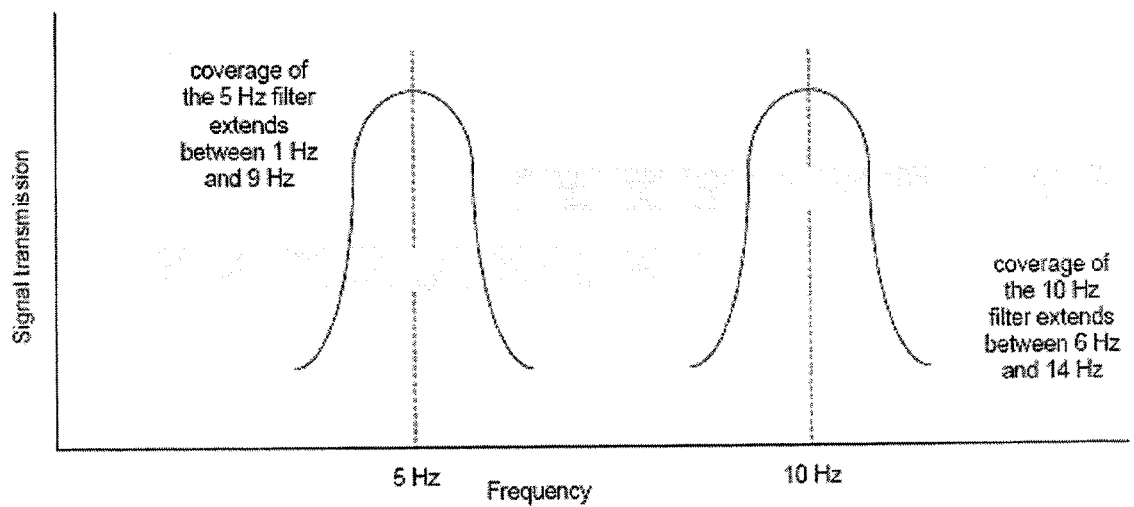
Figure 4: Frequency response of filters

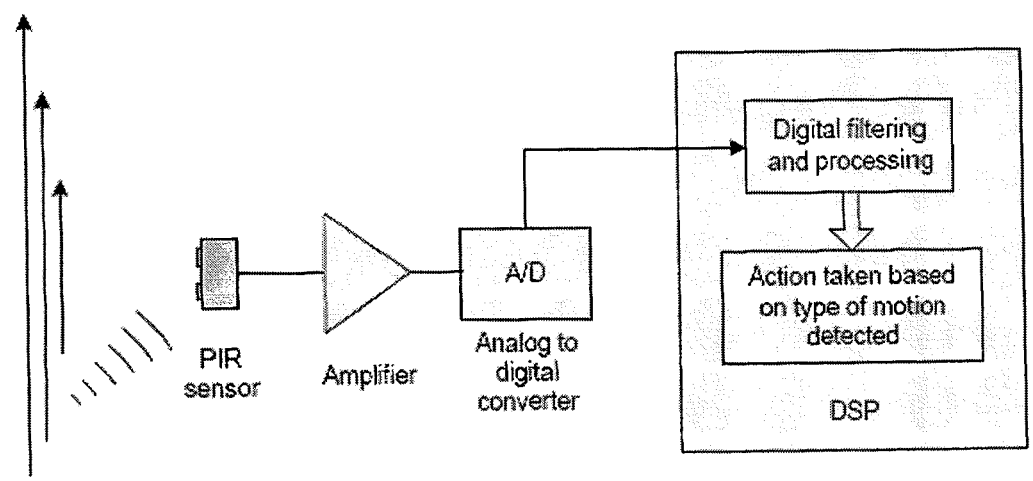
Figure 5: Alternative scheme which works but consumes more power

APPARATUS AND METHOD FOR PHOTOGRAPHING BIRDS

FIELD OF THE INVENTION

The present invention relates to the field of motion detector cameras and in greater particularity relates to motion detector cameras which are used to photograph wildlife in an outdoor environment. In even greater particularity the present invention relates to the use of a motion detector camera to detect and photograph birds or other small thermally detectable objects. In still greater particularity the present invention is relates to a camera and method of operation for the same that discriminates between the actual movement of the object to be photographed and the induced movement of the camera such as by wind or other environmental conditions.

BACKGROUND

An emerging segment in the bird watching market is for digital camera-based products that automatically take pictures of birds when triggered by motion detection. These cameras use a Pyroelectric Infrared (PIR) sensor to detect motion. The PIR sensor must be very sensitive to detect the typically small heat signature of a bird, and this leads to a problem: The high sensitivity required has a drawback in that it greatly increases the probability of false triggers: Other animals, sun radiation, swinging bird feeders and moving foliage or other objects are examples of events that have the potential to trigger the PIR detector. These false triggers of course lead to pictures without birds in them. In this paper we present a novel approach to detect the motion of birds with a higher rate of success, or percentage of pictures that capture a bird, than the current state of the art. It should be understood that the use of the technology is not limited to photography birds but may also apply to other discrete objects.

A typical PIR motion sensing system includes two main components: the PIR sensor and the Fresnel Lens. The Fresnel lens divides the detection space into multiple sub-detection zones and also creates "dead bands", areas between subdetection zones due to the discontinuities in the Fresnel lens surface. These dead bands significantly attenuate the IR signature of a body of heat. As a body (or a heat source in the IR frequency range) crosses from one sub-detection zone to the next, the heat signature of the body is sensed sequentially by the PIR sensor. The sensor produces electrical signals proportional to the amount of IR radiation hitting its surface. These signals are monitored and processed by the system electronic circuitry and are interpreted as motion. The strength of the sensor signal depends on the size and direction of motion of the body, the distance of the body from the sensor and the body speed. It should be understood that the strength of the sensed signal will vary as the dead bands are crossed in a repetitive manner, the PIR lens alternating sub-detection zones followed by dead bands will produce alternating relatively strong signals followed by a relatively attenuated signals; all these signals in a contiguous sense comprise one time varying signal that can be characterized by a frequency which is proportional to the speed of the moving body of heat, therefore, the speed at which the dead bands are crossed will give an indication of the speed at which the heat source is moving within the field of view.

Typically manufacturers recommend that a motion detector camera be securely mounted to an immovable object such that the camera is free from movement, inasmuch and the relative motion induced by camera instability can sometimes result in a false reading as the field of view of the motion detector changes. Where a bird feeder is subject to movement due to wind or other environmental influences, the movement of the feeder can in some instances create changes in the thermal energy incident on the PIR and cause a false trigger.

SUMMARY OF THE INVENTION

The present invention overcomes the above shortcomings and allows the out put of the PIR to be used to differentiate between environmental movement of the feeder and the motion of a bird approaching the feeder. That is to say, although the feeder may be moving within the field of view of the motion detector camera, the present invention detects any movement of a bird and disregards the movement of the camera or feeder due to environmental conditions. This is achieved using a set of band pass filters to filter the output signal of the PIR to actuate the camera mechanism only in response to objects moving at greater speed than environmentally induced speeds and thereafter to trigger photographs of movement consistent with the movement of a bird at a feeder.

BRIEF DESCRIPTION OF THE DRAWINGS

A further understanding of the invention may by had by study of the appended drawings which form a portion of this application and wherein:

FIG. 1 is a pictoral representation of the theory of speed detection using a Fresnel lens and a photodetector;

FIG. 2 is a pictoral representation of the processing of a signal generated when an object crosses the field of view of the detector FIG. 3 is a pictoral illustration of the processing of a signal depending on its frequency:

FIG. 4 is a pictoral representation of the frequency response of the filters used in the preferred embodiment;

FIG. 5 is a pictoral representation of an alternate embodiment wherein the signal is digitally processed.

DESCRIPTION OF THE PREFERRED EMBODIMENT

In trying to significantly reduce the number of false triggers it is necessary to understand various aspects of bird behavior as well as some physical attributes of different birds. The key factors that are important include size, body temperature, wing-beat frequency, flying speed (including take-off and landing), time spent feeding, and general behavior traits while feeding. We also examine the common types of feeders used, how those feeders might be positioned and how they might be influenced by factors such as wind or birds landing on them. With these factors better understood a method for filtering can be developed to greatly improve the percentage of "successful" pictures.

Bird Size and Mass: As might be expected the mass of a flying bird is small, ranging from ½ an Ounce for a smaller bird such as a Finch up to over 10 Ounces for a larger bird such as a Pigeon1. Looking at sizes of the bird, another metric that is useful is the wingspan or wing area. Smaller birds such as the Finch have wingspans of just under 8 inches whereas on the other end of the scale, a midsized bird such as a Pigeon has a wingspan of over 23 inches2.

Body Temperature: Birds typically have a higher body temperature compared to other animals such as mammals. Most birds have a body temperature of between 104° F. to 111° F.

Wing-Beat Frequency: Smaller to medium-sized birds will fly using multiple wing beats per second. For example, the Barn Swallow will have a beat frequency is in the range of 6 to 7 beats per second3 whereas the Zebra Finch, a smaller bird, has a wing-beat frequency near 27 beats per second4. During landing this frequency is typically lower and during take-off this frequency is typically higher. In general, there is a relationship or trend between wing beat frequency and the wing length of a bird5.

Flying Speed: Of particular interest is the speed and timing of a bird landing at a feeder. Depending on bird species, weather (wind) conditions, type of feeder, and the angle of decent to name a few, the physics of a bird landing can vary greatly. Because of this our analysis will just look at approximate metrics and consider the local field of view of the camera near a feeder. As an example, analysis of Pigeons in their flight behavior show that when approaching a landing, they might already have slowed down so that in the last one third of a second of flight the average speed is more than 3 mph (about 5 feet per second)6. In this short time the bird will cover 1 to 2 feet of distance, which must be considered when selecting the field of view of the camera and associated motion detection method. To complicate the motion, during landing it is possible that the bird feeder moves or swings as a reaction to the landing force and must be considered.

Feeding: Once a bird lands, it typically retracts its wings, meaning the surface area emitting infrared radiation is smaller. Feeding can be characterized by quick, short and jerky movements. For example, an analysis of the feeding behavior of the House Finch showed that the mean time of the bird staying at the feeder was under 2 minutes and that the number of pecks per minute was about 11.57. These pecks are typically abrupt and quick. In the extreme case, when a Woodpecker is pecking the impact velocity is of the order of 20 to 23 feet/s and each high speed peck occurs in a fraction of second. In summary, after landing, the small surface area of the bird must be detected in which the magnitude of movement or displacement is very small but the speed of the motion is high.

Here we present a novel method of detection that when compared to the current state of the art, can better discriminate between bird motion and other undesirable events that can trigger a sensitive motion sensor. We know that sensitive motion detection is required since our analysis of birds tells us that they are a relatively small sized heat source and that once they have landed on a feeder or perch their motion will be quick with a small displacement. We also know the approximate speed of landing of a bird and the frequency of movement and wing flapping. We must differentiate motion with these types of characteristics from other unwanted sources of motion that can trigger the detector.

In developing an approach to discriminate bird motion form other types of motion we rely on the "speed" of the moving body. We use a method that relies on speed specific filters. As a first step we use a Detection Speed Specific Filter, as illustrated in FIG. 2. The benefit of this speed specific filter is that all other things being equal, the output level of the filter is proportional to the speed of the subject passing by the elements in the PIR sensor. the "camera system" perceived speed depends on the actual speed of bird but also on the distance of the bird from the PIR lens; this is because the PIR lens is a divergent optic (with an angle of +/−11 deg) which means that as we move away from the PIR lens the distance between zones also becomes slightly larger. Accordingly, speed specific or speed dependant actually refers to the speed of the object and the distance of the object from the lens both of which affect the perceived "speed" at the detector. Therefore our filter parameters had to be chosen with this in mind; the optimum target distance for detecting bird flight using the 10 Hz filter was around 2 ft. Therefore the filter can give us some indication of how fast the object is moving. Motion that is fast, such as the approach of a bird during landing, can be distinguished from other types of motion, such as the relatively slow speed of a branch moving in the wind.

The second key step in our approach is to use multiple filters in parallel in order to distinguish more than one type of motion. FIG. 3 shows a multiple filter circuit; in this case there are three filters that can be used independently or in combination. Each filter will pass signals that are based on a predetermined range of frequencies, signifying different bird speeds, while attenuating or effectively blocking all others. By having control over the response in terms of frequency we are able to discriminate between motion such as the quick and abrupt movement of a feeding or pecking bird from slower (or faster) movement.

Based on our testing with birds we have decided to use a two filter approach as shown in FIG. 4 below; The 5 Hz and 10 Hz filters, allow motion centered around 5 or 10 cycles per second, respectively, to be passed and detected, while other frequencies are attenuated or effectively blocked. Each filter is designed to pass its center frequency best and attenuate other frequencies. FIG. 4 also shows the response of our filters as a function of frequency. The 5 Hz filter has a bandwidth of 1 Hz to 9 Hz and the 10 Hz filter has a bandwidth of 6 Hz to 14 Hz; the bandwidth is an adjustable parameter. In general, filters can be designed to be high-pass (all frequencies above a threshold are passed) or low-pass (all frequencies below a threshold are passed). We chose to use band pass filters in our method is to eliminate low frequency and high frequency noise during the time of our specific decision making. The parameters we chose for the filter center frequencies and bandwidth were determined both by reference to bird flight information and by testing in the field with various size birds. It will be appreciated that with other targets of interest, such as small mammals for example, the motion generated frequencies may vary slightly.

In our method, combining a 10 Hz filter and a 5 Hz filter enables us to first, distinguish the landing of a bird (by accepting signals that come from the 10 Hz filter) from other events that could "falsely" trigger the motion sensor and then continue to accurately and sensitively detect bird-like motion (by accepting signals from both filters) If we do not detect a first landing event, using the 10 Hz filter, then it is possible to ignore detected motion which would with some probability be considered a false trigger. So in essence, the landing of the bird does not trigger the capture of a picture, but rather tells us only that a bird has landed. If indeed that is the case, employing more permissive motion detection by using both the 5 Hz and the 10 Hz filters together, lets us decide that the subsequent triggers we are receiving are those of a bird feeding or hopping around. Note that it would be possible to tune the filter parameters in order to make our system able to roughly distinguish between different types of birds based on body mass and landing speed. It is also important to note that the field of view of the Fresnel lens we discussed earlier or more specifically the shape of the detection space that this lens defines, must be narrow enough to center on the target bird feeder, but also wide enough to accurately detect the bird flying in for a landing; we have chosen a circular detection space, (think of it as a cone) that has an inclusive detection angle of around 22 degrees.

The method of using filtering stages can be realized using a variety of implementations, including using analog electronic circuitry, which we have favored in our design, and using digital filtering methods. Digital Signal Processing (DSP) is illustrated in FIG. 5. In this case the two filtering components are implemented in software on the DSP. This method is also notable because it offers flexibility in changing the filter parameters without requiring hardware adjustments, but is has the disadvantage of requiring more electrical current to operate and it would be preferred for systems that do not rely on battery power.

The current state of the art in motion-detection bird cameras employs standard PIR sensor and filtering techniques. However, due to the high sensitivity required to detect birds, the number of false triggers that can be brought about by "noise" (signals generated by occurrences of a moving feeder or moving foliage) can result in many occurrences of pictures without birds. This patent relates to a two-stage filtering method that enables discriminating of bird-like motion from other undesirable motion sources. The net result is a higher percentage of pictures taken, that contain birds.

While we have described our invention in terms of only a few embodiments, it is not so limited but extends to the full range and scope of the appended claims.

What we claim is:

1. A system for taking pictures of small thermally detectable objects including birds, comprising: a camera for capturing images, a pyroelectric infrared detector operatively connected to yield output signals responsive to motion of a small thermally detectable object within the field of view of the detector, said output signals varying in frequency dependent upon the speed of the object within the field of view, a programmable controller operatively connected to said detector and said camera and programmed to arm said camera responsive to said output signals within a first frequency range which corresponds to the landing speed of a bird and to cause said camera to capture images thereafter responsive to said output signals within said first frequency range or a second frequency range.

2. A system as defined in claim 1 further comprising a Fresnel lens having a plurality of low transmisivity zones defining the field of view of said detector, said detector output signal varying in amplitude as an object within the field of view passes through said zones thereby providing a detector output signal the frequency of which is determined by the speed at which the object passes through said zones.

3. An apparatus as defined in claim 2, wherein said programmable controller is programmed to receive said output signals and to process said output signals to selectively arm said camera and trigger said camera only in response to signals falling within predetermined frequency ranges.

4. An apparatus as defined in claim 3, wherein said programmable controller is programmed to trigger said camera in response to output signals at a frequency corresponding to non-flying movement of a bird.

5. A system as defined in claim 1 wherein said first frequency range is between about 6 hertz to about 14 hertz.

6. A system as defined in claim 1 further comprising at least one band pass filter operatively connected to the output of said detector to filter said output signals there from before said output signals are received by said controller.

7. An apparatus as defined in claim 1 further comprising a first band pass filter connected between said pyroelectric infrared detector and said a programmable controller to pass only output signals corresponding to the landing speed of a bird and a second band pass filter connected between said pyroelectric infrared detector and said a programmable controller to pass only output signals corresponding to the typical movement of a bird on a perch.

8. A method for capturing images of small thermally detectable objects including birds using a motion detector actuated camera comprising the steps of defining a field of view for a motion detector associated with the camera including an area where small thermally detectable objects can enter and be photographed;

detecting relative motion of an object within said field of view using said motion detector;

performing initial filtering of electronic signals generated by said detected motion based on the speed of the object to determine whether said camera should be actuated;

detecting relative movement within the field of view subsequent to activation of said camera, performing additional filtering of electronic signals generated by said subsequently detected movement to determine whether said camera should capture an image, and Capturing one or more images of the field of view in response to said additional filtering.

9. The method as defined in claim 8 wherein said initial filtering and said additional filtering is performed using band pass filters passing selected frequency ranges.

10. The method as defined in claim 9 wherein said initial filtering and said additional filtering discriminates based on the speed of movement within the field of view.

11. The method as defined in claim 10 where said initial filtering and said additional filtering pass signals generated by movement at different speed ranges.

12. The method as defined in claim 11 where in said speed ranges overlap.

* * * * *